United States Patent [19]

Hungerford

[11] 4,389,505

[45] Jun. 21, 1983

[54] PLASTICIZED POLYACRYLONITRILE, A FILM THEREOF AND A PROCESS FOR FILM PREPARATION AND PLASTICIZATION

[75] Inventor: Gordon P. Hungerford, Palmyra, N.Y.

[73] Assignee: Mobil Oil Corporation, New York, N.Y.

[21] Appl. No.: 331,427

[22] Filed: Dec. 16, 1981

[51] Int. Cl.³ ............................................... C08K 5/06
[52] U.S. Cl. ...................................... 524/376; 524/560; 524/565
[58] Field of Search .................... 524/376, 560, 565

[56] References Cited

U.S. PATENT DOCUMENTS

| | | | |
|---|---|---|---|
| 2,425,755 | 8/1947 | Roberts et al. | 260/615 |
| 2,715,112 | 8/1955 | Stanton et al. | 524/376 |
| 2,978,431 | 4/1961 | Gneve | 524/376 |
| 3,015,570 | 1/1962 | Bowman et al. | 106/181 |
| 3,032,521 | 5/1962 | Sanderson | 524/376 |
| 3,374,171 | 3/1968 | Davis | 252/34.7 |
| 3,502,744 | 3/1970 | Weitzel et al. | 524/376 |
| 3,625,915 | 12/1971 | Gubler et al. | 524/565 |

FOREIGN PATENT DOCUMENTS 1466865  3/1977  United Kingdom .

*Primary Examiner*—Paul Lieberman
*Assistant Examiner*—Herbert J. Lilling
*Attorney, Agent, or Firm*—Charles A. Huggett; James F. Powers, Jr.; James P. O'Sullivan, Sr.

[57] ABSTRACT

A plasticized polyacrylonitrile composition and a film thereof containing a plasticizing proportion of a liquid polyether prepared by reacting ethylene oxide and propylene oxide with at least one monohydric alcohol active hydrogen compound initiator having about one to about ten aliphatic carbon atoms to yield a heterized copolymer. The invention is also concerned with a continuous process for the introduction of the plasticizing proportion of said liquid polyether into the polyacrylonitrile aquagel film.

21 Claims, 2 Drawing Figures

PLASTICIZED POLYACRYLONITRILE, A FILM THEREOF AND A PROCESS FOR FILM PREPARATION AND PLASTICIZATION

BACKGROUND OF THE INVENTION

This invention relates to plasticized polyacrylonitrile compositions and the production of oriented plasticized polymer film. In particular, it relates to polyacrylonitrile (PAN) compositions and methods for applying a liquid polyether plasticizer to water-containing PAN substrates during film manufacture.

High nitrile polymers are employed in making packaging films, foils and sheets having good resistance to passage of oxygen and water vapor. PAN homopolymer film is an excellent gas barrier material; however for some applications, it lacks adequate flex-crack resistance in unmodified form, even after molecular orientation. Addition of an inert or non-hazardous plasticizer to improve flex performance, stress-strain properties, impact strength, etc. is desirable for food packaging or wrap film.

It is an object of the invention to provide an novel PAN plasticizer system. It is a further object of the present invention to provide this novel combination in film form. It is yet another object of the present invention to provide a facile process for the introduction of a particular class of liquid polyethers into the PAN polymer system.

SUMMARY OF THE INVENTION

The present invention is concerned with a plasticized polyacrylonitrile composition comprising a high nitrile addition polymer having at least 80 percent acrylonitrile repeating units; and containing a plasticizing proportion of a liquid polyether prepared by reacting ethylene oxide and propylene oxide with at least one monohydric alcohol active hydrogen compound initiator having about 1 to about 10 aliphatic carbon atoms to yield a heterized copolymer. These materials are water soluble or water miscible and have an average molecular weight of from about 500 to about 5000 and a Saybolt viscosity at 100° F. of from about 85 to about 5200 seconds. A preferred average molecular weight range is from about 800 to about 4600 and a preferred Saybolt viscosity at 100° F. is from about 160 to about 5100 seconds. A particularly preferred average molecular weight is from about 800 to about 2000.

One skilled in the art is capable of determining the meaning of the phrase "a plasticizing proportion." Concerning the subject compositions and the polymer in its film form broadly the proportions contemplated should be at least 1 weight percent of the PAN polymer. More specifically, the polyether is present in from about 5 to about 20 weight percent of the PAN polymer.

A continuous process for forming the subject plasticized PAN film comprises the steps of:

maintaining a predetermined concentration, in an aqueous solution, of a plasticizer comprising a water soluble liquid polyether, said polyether having been prepared by reacting ethylene oxide and propylene oxide with at least one monohydric alcohol active hydrogen compound initiator, having about 1 to about 10 aliphatic carbon atoms, to yield a heterized copolymer;

contacting continuous polyacrylonitrile aquagel film with said solution;

absorbing said polyether into the aquagel;

sequentially or simultaneously stretching the plasticizer-aquagel-PAN film system to orient the polyacrylonitrile film; and drying the oriented film to at least substantially remove the water and yield the effectively plasticized film.

The process is particularly adaptable for plasticizing PAN with the subject water-miscible polyether by maintaining a predetermined concentration of the polyether in the aqueous bath under steady state process conditions. The continuous polymeric aquagel film is, e.g., passed through the bath at substantially constant water content. The impregnant is thereby coated onto the film. The impregnant may be added to the aqueous bath in a steady stream comprised essentially of the polyether. The polyether can be metered to the bath substantially undiluted and additional water can be input to the process as needed.

It is to be understood that the polyether alone, or as a water solution, can be applied to the PAN film in any fashion, for example, by spray, roller, brush, etc. application.

The polyethers contemplated herein have been known since at least the 1940's. The subject polyethers are essentially mixtures of monohydroxy alcohols, which may be obtained by the addition, to one or more monohydroxy aliphatic alcohols, of a mixture of alkylene oxides containing ethylene oxide and 1,2-propylene oxide in an oxide ratio of from about 75-25 to 10-90 ethylene oxide to 1,2-propylene oxide. As stated otherwise, the oxide ratio can be from one-third part to nine parts propylene oxide per part of ethylene oxide by weight. These ratios are qualified by the molecular weight range mentioned above and the necessity for at least substantial water solubility or miscibility.

The reaction which takes place between the alcohol or alcohols and the ethylene oxide and the 1,2-propylene oxide, seems to be a simple addition reaction wherein the alkylene oxide molecules undergo conversion to the corresponding oxyalkylene radicals as illustrated for any given molecule by the following general equation:

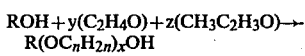

wherein ROH is one or more aliphatic monohydroxy alcohols; y and z represent the moles of ethylene oxide and 1,2-propylene oxide, respectively; n is both 2 and 3 in a single molecule, the total number of times n has a value of 2 can be equal to y and the total number of times n has a value of 3 can be equal to z; and x is the total number of such oxyalkylene groups, being equal to y+z.

From such properties as the average molecular weight, refractive index, density, viscosity, rate of change of viscosity with change in temperature, as well as upon theoretical considerations, it appears that these products are complex mixtures of monohydroxy polyoxyalkylene aliphatic monoethers having polyoxyalkylene chains of different lengths in different internal configurations with the hydroxyl group appearing at one end of the chain and the aliphatic group of the starting alcohol or starting alcohols at the other, and containing in a single molecule, both the oxyethylene group and the oxy-1,2-propylene group. These materials have been referred to as mixtures of monohydroxy heterized oxyethylene oxy-1,2-propylene aliphatic monoethers. By the term "heterized," it is meant that the monoethers vary in internal configuration from molecule to molecule, such variation arising out of a randomness of the distribution of the oxyethylene and the oxy-1,2-propylene groups therein, for instance from the concurrent reaction of ethylene oxide and 1,2-propylene oxide with the aliphatic monohydroxy alcohol or alcohols. By the use of the term "heterized," is not meant to exclude the presence of relatively small blocks of polyethylene oxide groups and with relatively small blocks with polyoxy-1,2-propylene oxide groups. These materials have also been generically referred to as polyalkoxylated polyethers apparently when a mixed aliphatic alcohol initiator is employed in the formation thereof.

For a more detailed exposition of the materials contemplated herein and the process of preparing the same, reference is made to U.S. Pat. No. 2,425,755. The general method of preparation of the polyethers of said patent, from a single monohydroxy $C_1$–$C_{10}$ alcohol or a mixture of two or more of said alcohols is incorporated herein by reference. Particularly preferred, for use herein as plasticizers for PAN, are the mixed polyethers formed from the initiator, butyl alcohol, or a mixture of ethyl alcohol and butyl alcohol.

THE DRAWINGS

FIG. 1 is a schematic representation in side view of a system for producing aquagel film; and FIG. 2 is a schematic side view of a system for orienting and drying film according to the present invention.

DESCRIPTION OF PREFERRED EMBODIMENTS

As indicated above, the materials contemplated herein are commercially available materials. A particularly preferred series of commercially available materials are sold under the name Pluracol$^R$ W polyols and available from BASF Wyandotte Corp. These materials are a series of water-soluble monofunctional polyalkoxylated polyethers. Table 1 gives typical physical properties for the Pluracol W series, which are employed as representative of the plasticizing agents contemplated herein.

propylene oxide units with butanol or a mixture of butanol and ethanol.

PAN film feedstock to be fed to the orientation system can be derived from continuous film casting or extruding equipment. Flat PAN film may be solvent cast according to the process of U.S. Pat. No. 4,066,731, wherein acrylonitrile homopolymer or interpolymer is cast onto a rotating drum from a sheeting die and coagulated as a self-supporting film. Organic solvent, such as dimethylsulfoxide, can be washed with a water bath to obtain an aquagel film typically containing 40 to 60 percent water integrally bound in the molecular interstices or dispersed in the orientable polymer matrix. A tubular PAN film can be extruded and water-coagulated, if desired, and the unoriented film can be slit and fed to the treatment and orientation units as a flat strip. Aqueous PAN film can also be made by melt-extrusion of a high temperature polymer hydrate in a known manner.

The preferred PAN feedstock is an addition polymer material containing sufficient water to be stretched at low temperatures. Acrylonitrile polymers containing at least 5% $H_2O$, preferably aquagels, containing about 40 to 60%, $H_2O$, are excellent film substrates for use herein. The present system is especially valuable for treating PAN homopolymer, such as DuPont Type A resin. Polymers that are particularly useful for treatment with the subject polyether mixtures are high-nitrile materials, preferably containing at least 80% acrylonitrile repeating units. Homopolymer PAN, copolymers and interpolymers with hydrophilic ethylenically-unsaturated monomers, such as acrylic acids and esters, etc., may be adapted to the novel process. Typical high-nitrile polymers are disclosed in U.S. Pat. Nos. 2,585,444, 3,873,508, 3,896,204, 3,984,601 and 4,053,442, incorporated herein by reference.

Figure 1:
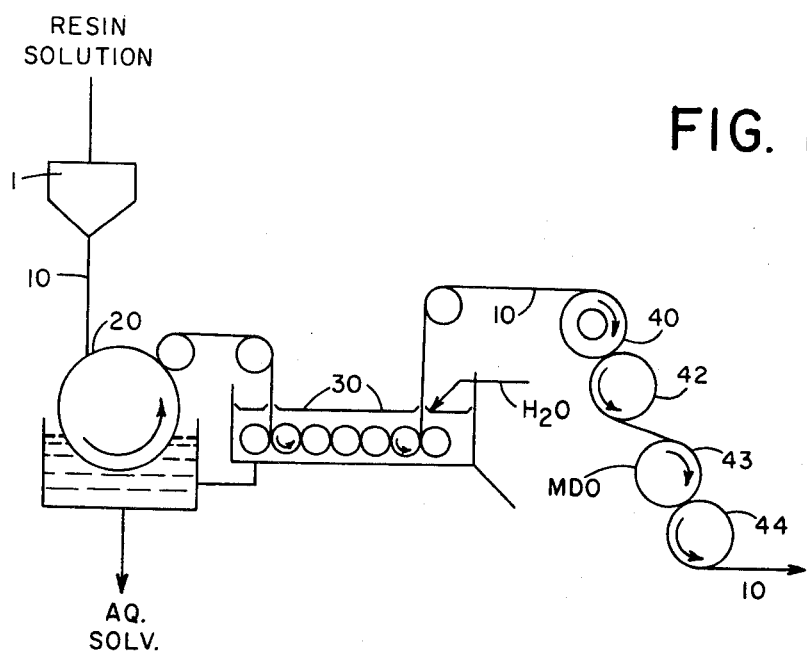

Referring to FIG. 1, a continuous flow system for manufacturing aquagel film is shown. For instance, hot polyacrylonitrile-dimethylsulfoxide solution is fed under pressure to sheeting die 1, which extrudes a thin film of polymer solution onto cold drum surface 20. After contacting an aqueous medium, the self-supporting aquagel film is stripped from drum 20 and traverses

TABLE 1

| | PRODUCT NAME | | | | |
|---|---|---|---|---|---|
| | W-5100 | W-3520 | W-2000 | W-660 | W-170 |
| | PPG-33- | PPG-28- | PPG-20- | PPG-12- | PPG-5- |
| CTFA Name | Buteth-45 | Buteth-35 | Buteth-30 | Buteth-16 | Buteth-7 |
| Viscosity at 100° F. (SUS) | 5100 | 3520 | 2000 | 660 | 160–180 |
| Pore point °F. (ASTM D 97-47) | −20 | −20 | −25 | −34 | −45 |
| pH 10% aqueous (25° F.) | 5.5–7.0 | 6.0–7.5 | 5.5–7.5 | 5.5–7.5 | 5.5–7.5 |
| Specific gravity @ 20° C./20° C. | 1.06 | 1.06 | 1.06 | 1.055 | 1.03 |
| Color, APHA | 40 max. | 40 max. | 50 max. | 50 max. | 50 max. |
| Water Percent | less than 0.2 | less than 0.2 | less than 0.25 | less than 0.2 | less than 0.2 |
| Flash Point °F. (Open Cup) | 437 | 437 | 440 | 440 | 360 |
| Cloud Point 1%° C. | 55 | 57 | 57 | 60.5 | 73 |
| Density, lbs./gal @ 25° C. | 8.83 | 8.83 | 8.3 | 8.79 | 8.58 |
| Molecular Weight | 4600 | 4000 | 3250 | 2000 | 800 |

The products identified in the foregoing Table 1 can be formed by the general process described in aforementioned U.S. Pat. No. 2,425,755 or in U.S. Pat. No. 2,549,438. These materials can be formed by condensing, e.g., a 50-50 mixture of the ethylene oxide and a counter-current aqueous bath 30, wherein the dimethylsulfoxide is removed and replaced by water, thereby forming the aquagel. The film 10 passes through the machine direction orientor (MDO) 40, comprising a first heated roll maintained at about 70° C. and thereafter a series of orienting rolls 42, 43 and 44. These rolls are maintained at a sufficient differential speed to longitudinally stretch the film at a ratio of about 2:1 to 3:1 thereby providing a uniaxially oriented aquagel film. The faster rolls are kept at about 50° C. Thereafter the film is transferred to plasticizer and TDO sections shown in FIG. 2.

Figure 2:
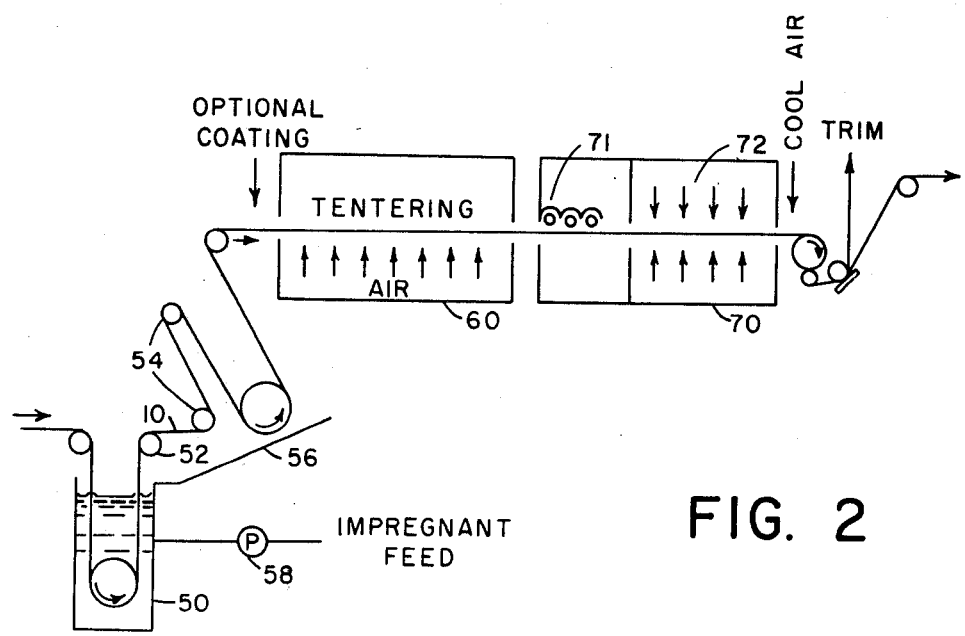

Referring to FIG. 2, the uniaxially oriented aquagel film 10 is passed at constant linear rate (e.g., about 15 cm/sec.) through impregnating treatment tank 50 containing an aqueous bath of, for example, Pluracol W-170. There, it is maintained in contact with the impregnant solution for adequate residence time. Excess solution may be wiped from the film immediately if sufficient tank residence permits substantial equilibrium. Additional contact time may be obtained by permitting drag-out of the treating solution, with downstream rolls 52 and 54 removing excess solution and returning it to tank 50 via gravity drip trough 56. In any event, sufficient plasticizer is left on the film to continue to be imbibed into the film. This equipment arrangement minimizes tank size. Advantageously, undiluted polyether impregnant is metered at constant rate to tank 50 by metering pump 58 and in addition, it is necessary to meter in sufficient water to maintain tank level.

As the film progresses as shown in FIG. 2, it passes through a transverse direction orientation (TDO) unit 60. The transverse direction orientation step is usually affected by attaching edge clips to the film progressively and stretching the film perpendicularly to its machine direction travel. The edge portions are much thicker than the main body of the film and are ordinarily trimmed from the finished product. In the TDO unit the film may be contacted with moist hot gas to prevent excessive water loss. Means for impinging hot water saturated air or the like at high velocity can be provided in a standard tentering apparatus. TD stretch ratios of 2:1 to 4:1, or higher, may be employed, with 3:1 being employed for typical PAN aquagel film. In the TDO unit, conditions are such that the plasticizer solution is thoroughly imbibed into the PAN sheet.

The biaxially oriented film is dried under constraint to remove water and other volatile materials which may be present in the film, e.g., either residual organic solvent or monomer from the film casting operation or volatile components of secondary organic treating compositions. As the film passes through the drier unit 70, it receives energy from a bank of radiant heaters 71 and thereafter is completely dried in oven section 72, where hot air at about 200° C. is directed towards the film at high velocity. Thereafter the film is reduced to handling temperature by a stream of cool air at the exit end of drier 70 and trimmed by slitting blades to remove the edge portions. The biaxially oriented film may then be wound onto a spool for storage for further processing by additional steps, or taken directly to a fabrication line.

EXAMPLES 1-4

Polyacrylonitrile homopolymer aquagel film is made according to U.S. Pat. No. 4,066,731. The sheet weights about 140 mg/in$^2$ to 250 mg/in$^2$ and contains about 45 to 50% water. It is longitudinally stretched two times on a machine direction orientor with a first heated roll (75° C.) and cooler speed differential rolls (50° C.). The uniaxially oriented wet film enters the treatment apparatus at a linear speed of about 9 meters/minute.

The plasticizing polyether is diffused into the aquagel film by passing the film through a dip tank containing about 27.5 to 30 weight percent of the polyether at ambient temperature (20°-25° C.). After TD stretch orientation (3×) and drying, the polyether treated films were compared with untreated pure PAN film using a standard flex-crack test. Table 2 shows the percentage of polyether which can be extracted from the plasticized film by water at 25° to 100° C. temperature over a time period of 30 minutes.

TABLE 2

| Property | (Control) Run #1 | Pluracol W 170 Run #2 | Pluracol W 660 Run #3 | Pluracol W 660 Run #4 |
| --- | --- | --- | --- | --- |
| Nominal dip bath conc. | 0 | 27.5% | 27.5% | 30% |
| Wt. percent polyether measured in film (dry basis) | 0 | 13.7% | 14.4% | 15.0% |
| Extreme flex-crack test (number of pinholes per 54 square inches after 100 Gelbo cycles) | Film Cracked After 1 Cycle | 4.5 | 4 | 3.5 |
| Amount of plasticizer extracted by H$_2$O | 0 | 0.07% | 0.2% | 0.68% |

The Flex-crack resistance is increased markedly by incorporating the polyether in the PAN homopolymer. Optical clarity remains excellent for the treated film, an important property for food packaging applications. The treated films are considerably less stiff, have higher impact strength and greater elongation at break than untreated PAN. Resistance to damage by handling and abrasion is outstanding. Under normal manufacturing and use conditions, the preferred polyether plasticizers are non-fugitive, which tends to prolong plasticizing during storage.

What is claimed is:

1. A plasticized polyacrylonitrile composition comprising:
   (a) a high nitrile addition polymer having at least 80% acrylonitrile repeating units; and containing
   (b) a plasticizing proportion of a liquid polyether prepared by reacting ethylene oxide and propylene oxide with at least one monohydric alcohol active hydrogen compound initiator having about 1 to about 10 aliphatic carbon atoms to yield a heterized copolymer, wherein said polyether is water soluble or water miscible and has an average molecular weight of from about 500 to about 5,000 and a Saybolt viscosity at 100° F. of from about 85 to about 5200 seconds.

2. The composition of claim 1 wherein said monohydric initiator is one or more members selected from the group consisting of methanol, ethanol, propanol and butanol.

3. The composition of claim 2 wherein said initiator is a combination of ethanol and n-butanol.

4. The composition of claim 2 wherein said polyether has an average molecular weight of from about 800 to about 4600 and a Saybolt viscosity of 100° F. of from about 160 to about 5100 seconds.

5. The composition of claim 2 wherein the average molecular weight is from about 800 to about 2000.

6. The composition of claim 1 wherein said liquid polyether is present in at least 1 weight percent of the polyacrylonitrile polymer.

7. The composition of claim 6 wherein said polyether is present in from about 5 to about 20 weight percent of the polyacrylonitrile polymer.

8. A plasticized polyacrylonitrile film comprising:
(a) an oriented high nitrile addition polymer having at least 80% acrylonitrile repeating units; and containing
(b) a plasticizing proportion of a liquid polyether prepared by reacting ethylene oxide and propylene oxide with at least one monohydric alcohol active hydrogen compound initiator having about 1 to about 10 aliphatic carbon atoms to yield a heterized copolymer, wherein said polyether is water soluble or water miscible and has an average molecular weight of from about 500 to about 5,000 and a Saybolt viscosity at 100° F. of from about 85 to about 5200 seconds.

9. The film of claim 8 wherein said monohydric initiator is one or more members selected from the group consisting of methanol, ethanol, propanol and butanol.

10. The film of claim 9 wherein said initiator is a combination of ethanol and n-butanol.

11. The film of claim 9 wherein said polyether has an average molecular weight of from about 800 to about 4600 and a Saybolt viscosity of 100° F. from about 160 to 5100 seconds.

12. The film of claim 11 wherein the average molecular weight is from about 800 to about 2000.

13. The film of claim 8 wherein said liquid polyether is present in at least 1 weight percent of the polyacrylonitrile polymer.

14. The film of claim 13 wherein said polyether is present in from about 5 to about 20 weight percent of the polyacrylonitrile polymer.

15. A continuous process for forming plasticized polyacrylonitrile film comprising the steps of:
maintaining a predetermined concentration, in an aqueous solution, of a plasticizer comprising a water soluble or water miscible liquid polyether, said polyether having been prepared by reacting ethylene oxide and propylene oxide with at least one monohydric alcohol active hydrogen compound initiator, having about 1 to about 10 aliphatic carbon atoms, to yield a heterized copolymer;
contacting continuous polyacrylonitrile aquagel film with said solution;
absorbing said polyether into the aquagel;
sequentially or simultaneously stretching the plasticizer-aquagel-polyacrylonitrile film system to orient the polyacrylonitrile; and
drying the oriented film to at least substantially remove the water and yield an effectively plasticized film.

16. The process of claim 15 wherein said polyether has an average molecular weight of from about 500 to about 5000 and a Saybolt viscosity at 100° F. of from about 85 to about 5200 seconds.

17. The process of claim 16 wherein said monohydric initiator is one or more members selected from the group consisting of methanol, ethanol, propanol and butanol.

18. The method of claim 17 wherein said initiator is a combination of ethanol and n-butanol.

19. The process of claim 17 wherein said polyether has an average molecular weight of from about 800 to about 4600 and a Saybolt viscosity at 100° F. of from about 160 to about 5100 seconds.

20. The process of claim 15 wherein said liquid polyether is present in at least 1 weight percent of the polyacrylonitrile polymer.

21. The process of claim 20 wherein said polyether is present in from about 5 to about 20 weight percent of the polyacrylonitrile polymer.

* * * * *